US010465807B2

(12) United States Patent
Jinno et al.

(10) Patent No.: US 10,465,807 B2
(45) Date of Patent: Nov. 5, 2019

(54) CONE VALVE

(71) Applicant: SUMITOMO METAL MINING CO., LTD., Tokyo (JP)

(72) Inventors: Hiroki Jinno, Tokyo (JP); Tetsurou Gotou, Tokyo (JP); Tsuyoshi Ito, Tokyo (JP); Tooru Kitazaki, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 79 days.

(21) Appl. No.: 15/520,798

(22) PCT Filed: Jul. 1, 2015

(86) PCT No.: PCT/JP2015/069024
§ 371 (c)(1),
(2) Date: Apr. 20, 2017

(87) PCT Pub. No.: WO2016/080013
PCT Pub. Date: May 26, 2016

(65) Prior Publication Data
US 2017/0314690 A1    Nov. 2, 2017

(30) Foreign Application Priority Data

Nov. 21, 2014  (JP) ................................. 2014-236461
Jan. 9, 2015  (JP) ................................. 2015-003105

(51) Int. Cl.
*F16K 15/06* (2006.01)
*C22B 3/00* (2006.01)

(52) U.S. Cl.
CPC ........ *F16K 15/063* (2013.01); *C22B 23/0415* (2013.01)

(58) Field of Classification Search
CPC ..................................................... F16K 15/063
(Continued)

(56) References Cited

U.S. PATENT DOCUMENTS 4,436,247 A *  3/1984  Akagi ................... F02M 47/02
                                                        239/533.7
6,371,441 B1 *  4/2002  Mattes ................. F02M 45/083
                                                        123/446

FOREIGN PATENT DOCUMENTS

DE    22 13 104 A1    10/1972
JP    S52-64903 U     5/1977
(Continued)

OTHER PUBLICATIONS

Oct. 6, 2015 International Search Report issued in International Patent Application No. PCT/JP2015/069024.
(Continued)

*Primary Examiner* — Marina A Tietjen
*Assistant Examiner* — Paul J Gray
(74) *Attorney, Agent, or Firm* — Oliff PLC

(57) ABSTRACT

A cone valve of the present invention enables to extend a lifespan more than a conventional cone valve even if it is used as a check valve when feeding slurry containing highly abrasive coarse particles. A cone valve (1) used as a check valve when feeding slurry, comprising at least a valve body (11), a valve seat (13), and a spring (14) incorporated to make the valve body (11) contact the valve seat (14), wherein an entire length of the spring (14) is at least shorter than a stroke length of the valve body (11).

1 Claim, 7 Drawing Sheets

(58) Field of Classification Search
USPC .................... 137/541, 543.15; 251/337, 338
See application file for complete search history.

(56) References Cited

FOREIGN PATENT DOCUMENTS

| | | |
|---|---|---|
| JP | S62-115571 U | 7/1987 |
| JP | H01-85409 U | 6/1989 |
| JP | H11-280927 A | 10/1999 |
| JP | 2005-350766 A | 12/2005 |
| JP | 2006-214539 A | 8/2006 |
| JP | 2009-173967 A | 8/2009 |
| JP | 2010-025455 A | 2/2010 |
| JP | 2014-205901 A | 10/2014 |

OTHER PUBLICATIONS

Jan. 5, 2018 Search Report issued in European Patent Application No. 15861728.2.

\* cited by examiner

| Solid content | mass% | 20~40 |
|---|---|---|
| Particle size of solid content | mm | <2.0 |
| Ni | mass% | 0.5~2.5 |
| Co | mass% | 0.01~0.20 |
| Fe | mass% | 20~50 |
| Si | mass% | 3~15 |
| Mn | mass% | 1~10 |
| pH | - | 3~6 |

CONE VALVE

BACKGROUND OF THE INVENTION

Field of the Invention

The present invention relates to a cone valve for preventing backflow when feeding fluid. More specifically, the present invention relates to a cone valve used for preventing backflow when feeding ore slurry obtained by the pretreatment of, for example nickel oxide ore, containing hard coarse particles, and capable of extending a lifespan by prohibiting the occurrence of malfunction by abrasion. In addition, the present application claims priority based on Japanese Patent Application No. 2014-236461 filed in Japan on Nov. 21, 2014 and Japanese Patent Application No. 2015-003105 filed in Japan on Jan. 9, 2015.

Description of Related Art

It was difficult to use nickel oxide ore as nickel resource by the reasons such that a nickel content ratio is low. However, a hydrometallurgical process using high pressure acid leach technology has been developed, and it became possible to produce, for example nickel-cobalt mixed sulfide (with nickel grade of approximately 60 wt %) economically (for example, refer to patent document 1).

An example of the hydrometallurgical process of nickel oxide ore is as follows: at first producing ore slurry from ore with prescribed particle size, supplying the obtained slurry to an autoclave with high temperature and high pressure, leaching valuable metal component by mainly using mineral acid, obtaining leachate by removing unnecessary objects such as leached residue by decreasing temperature and pressure, and sulfurizing the leachate to produce nickel-cobalt mixed sulfide.

The ore slurry is produced such that a solid content is approximately 20 to 40 g/L (refer to FIG. 9), and that a particle size of the solid content is approximately 2 mm or less (for example, refer to patent document 2), and supplied to the autoclave with high temperature and high pressure as the temperature of approximately 250° C. and as the pressure of 3.5 to 4.0 MPaG, and also, mineral acid for leaching, air for accelerating oxidization, steam for maintaining temperature and else are supplied together, and stirred by stirring machine to progress leaching.

It is necessary to increase the pressure to a high pressure at least higher than the above pressure, in order to supply ore slurry into the autoclave, so the pressure and the temperature of the ore slurry produced at atmospheric pressure and at temperature of plant environment is normally increased in stages by various means (for example, refer to patent document 3).

In initial stage, the temperature and the pressure are raised at the same time, by the combination of, for example heat exchanger and general feeding pump, to be the temperature of approximately 200° C. and to be the pressure of approximately 1.5 MPaG, but finally, it is pressed into the autoclave by pressurizing to be the pressure of 4.0 MPaG or more.

The devices used in a final pressurizing step are generally diaphragm type pump and cone valve type check valve. These types of device are used because it is possible to continuously supply the necessary amount (approximately 240 m$^3$/Hr) of ore slurry into the autoclave under the condition of high temperature and high pressure.

Especially, when increasing pressure by severe condition as the above (1.5 MPaG to 4.0 MPaG), generally a strong coil spring is used as the coil spring of the cone valve, in order to inhibit the backflow of slurry, and also, contact surfaces of a valve body and a valve seat of the cone valve are generally in point contact with each other (actually in circular contact) as section with either one of the contact surfaces having a curvature, as illustrated in FIG. 6.

However, ore slurry is sieved such that the particle size of solid content is 1 to 2 mm, more preferably, less than 1.4 mm. At this time, even when there is no coarse particle larger than 1.4 mm, slight backflow always occurs, and a local abrasion progresses by slight damage of valve body by the impact at the time of closing of the cone valve. Especially, as either one of contact surfaces of the valve body and the valve seat is formed to be rounded and curved, the contact area between the valve body and the valve seat is small, so slurry tends to pass through when the slurry is stuck in between the contact surfaces at the time of closing of the cone valve, and local abrasion occurs from the site at which it passed through.

In this way, spaces, which should be partitioned by the contact surfaces of the valve body and the valve seat, could be communicated with each other, and a problem occurs that it will not be possible to maintain a prescribed discharge amount.

When such problem occurs, it will be judged as a lifespan of a part, and it is necessary to stop the operation to exchange the worn part, so not only that operational efficiency will be decreased, but also that cost required for replacement part cannot be ignored.

Especially, the problem of decrease of operational efficiency will not be a major problem, if the lifespan of the part can be maintained until a timing for inspection and maintenance by stopping a plant according to a plan, for example, per 6 months (approximately 4,380 hours), as exchange of the part can be performed according to plan in accordance with that timing.

However, decrease of flow rate caused by the abrasion often occurs in about just 200 to 350 hours (about 8 to 15 days), so extension of the lifespan is required.

Simply, it can be considered to completely remove particles near upper limit of 1 to 2 mm, which tends to damage the valve body, or particles with particle size more than the upper limit, which will be mixed in by breakage and else of sieving equipment, but when trying to remove these particles completely, it will incur drastic increase of cost, so it is not realistic.

Also, it can be easily recalled to decrease the abrasion of the part by decreasing the amount of slurry passing through the cone valve (about 40 m$^3$/Hr/1 valve when operating at 60% stroke), but it is necessary to increase the feeding system of slurry, in order to maintain the amount of production of entire plant, so it is not preferable as it incurs an investment cost for the increase.

In addition, the technology to make the part less susceptible to abrasion also incurs increase of cost. Also, the technology to use the part to be sacrificed for abrasion will complex the valve structure, and it is not preferable in the point that maintenance time will be increased.

Also, for example in patent document 4, a technology for extending a lifespan of a check valve when feeding slurry of hard particles is described.

However, the valve structure will be complex as well as the above, in other words, it is a technology to use annular valve seat or annular packing and else made of high durability material for forming valve seat surface, and also, there is a difference that a valve body is ceramics spherical body, so it cannot be applied to the above problem.

Patent Document 1: Japanese Patent Application Laid-Open No. 2005-350766
Patent Document 2: Japanese Patent Application Laid-Open No. 2009-173967
Patent Document 3: Japanese Patent Application Laid-Open No. 2010-025455
Patent Document 4: Japanese Patent Application Laid-Open No. 2006-214539

SUMMARY OF THE INVENTION

The present invention is invented to solve such circumstances, and the purpose of the present invention is to provide a cone valve capable of extending a lifespan more than a conventional cone valve, even if it is used as a check valve when feeding slurry containing highly abrasive coarse particles.

The present inventors have studied earnestly about strength of spring, shape of cone valve and else, and reached a conclusion that the spring is not necessary for preventing backflow and it is fine as long as the spring can prevent fixation by hooking, and found that the above problem can be resolved by decreasing the damage by the impact of valve seat or valve body, which will be a trigger for local abrasion, by decreasing the impact at the time of closing of the cone valve by making the length of spring shorter, and further, by dispersing the impact by making the contact surfaces to be flat and smooth, which were in line contact.

A cone valve relating to the present invention is a cone valve used as a check valve when feeding slurry, comprising at least a valve body, a valve seat, and a spring incorporated to make the valve body contact the valve seat, wherein an entire length of the spring is at least shorter than a stroke length of the valve body.

Further, it is preferable that the slurry is slurry of nickel oxide ore.

Further, it is preferable that shapes of contacting parts of the valve body and the valve seat are formed to be flat.

The cone valve relating to the present invention can extend the lifespan more than the conventional cone valve, even if it is used as the check valve when feeding the slurry containing highly abrasive coarse particles, so it is having an extremely significant industrial value.

DETAILED DESCRIPTION OF THE INVENTION

Figure 1:
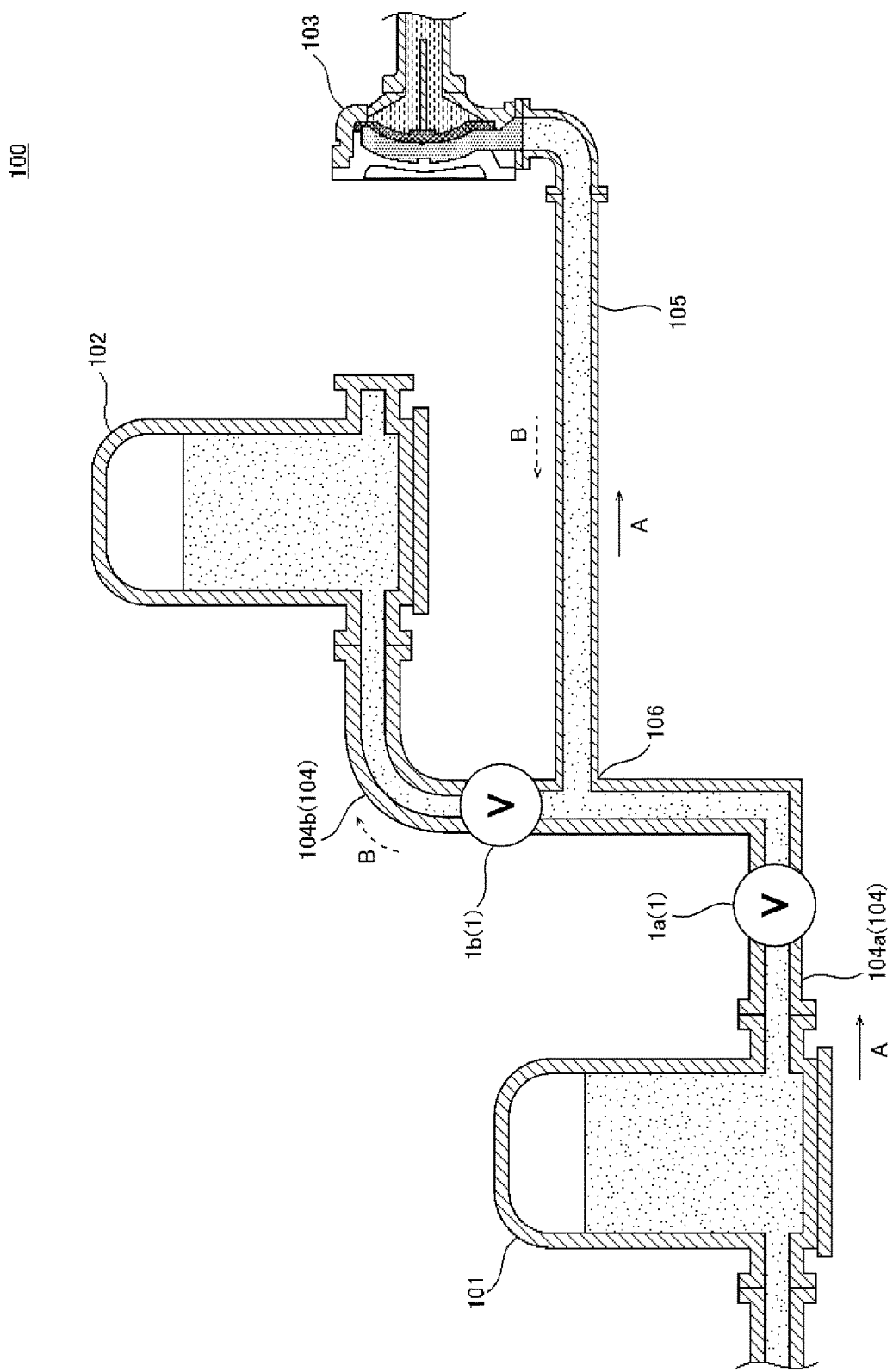
FIG. 1 is a schematic view illustrating an example of use of a cone valve relating to the present invention.

Hereinafter, it is explained about a cone valve relating to the present invention by referring to the drawings. In addition, the present invention is not limited to the following examples, and it can be changed optionally without departing from the gist of the present invention.

<Explanation of First Embodiment>

A cone valve 1 relating to the present invention is a cone valve used as a check valve when feeding slurry containing highly abrasive coarse particles (maximum particle size is 1 to 2 mm), for example when feeding ore slurry obtained by pre-treatment of nickel oxide ore, and for example, it will be installed in a feeding device 100 as illustrated in FIG. 1.

As illustrated in FIG. 1, the feeding device 100 comprises an upstream side slurry tank 101, a downstream side slurry tank 102, and a diaphragm type pump 103. The upstream side slurry tank 101 and the downstream side slurry tank 102 are connected by a first pipe 104. The diaphragm type pump 103 is connected to the first pipe 104 via a second pipe 105. And, one cone valve 1 is arranged at a first pipe 104a between a connection 106 of the first pipe 104 and the second pipe 105 and the upstream side slurry tank 101 (upstream side cone valve 1a), and one cone valve 1 is arranged at a first pipe 104b between the connection 106 and the downstream side slurry tank 102 (downstream side cone valve 1B).

And, the feeding device 100 is configured such that when diaphragm part of the diaphragm type pump 103 moves right (to one direction) and sucks in, the upstream side cone valve 1a will be in the open state, and the downstream side cone valve 1b will be in the closed state, and slurry will be supplied from the upstream side slurry tank (pressure is approximately 1.5 MPaG) 101 to the diaphragm type pump 103, as illustrated by solid line arrow A in FIG. 1.

On the other hand, the feeding device 100 is configured such that when diaphragm part of the diaphragm type pump 103 moves left (to other direction) and discharges, the upstream side cone valve 1a will be in the closed state, and the downstream side cone valve 1b will be in the open state, and slurry will be supplied from the diaphragm type pump 103 to the downstream side slurry tank (pressure is 4.0 MPaG or more) 102, as illustrated by dotted line arrow B in FIG. 1.

Thus, when feeding the slurry containing highly abrasive coarse particles, the cone valve 1 is repeatedly switched to open state and closed state, along with the repeated movement of the diaphragm part of the diaphragm type pump 103 in left and right directions (one or other direction) under the condition of high temperature and high pressure (1.5 MPaG to 4.0 MPaG).

Figure 2:
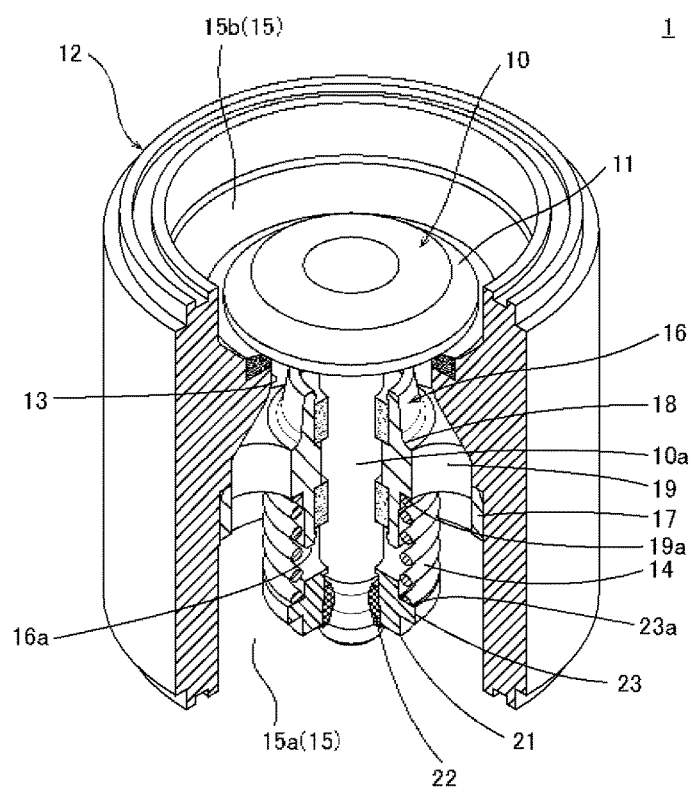
FIG. 2 is a sectional perspective view illustrating an example of a cone valve relating to the present invention.
Figure 3:
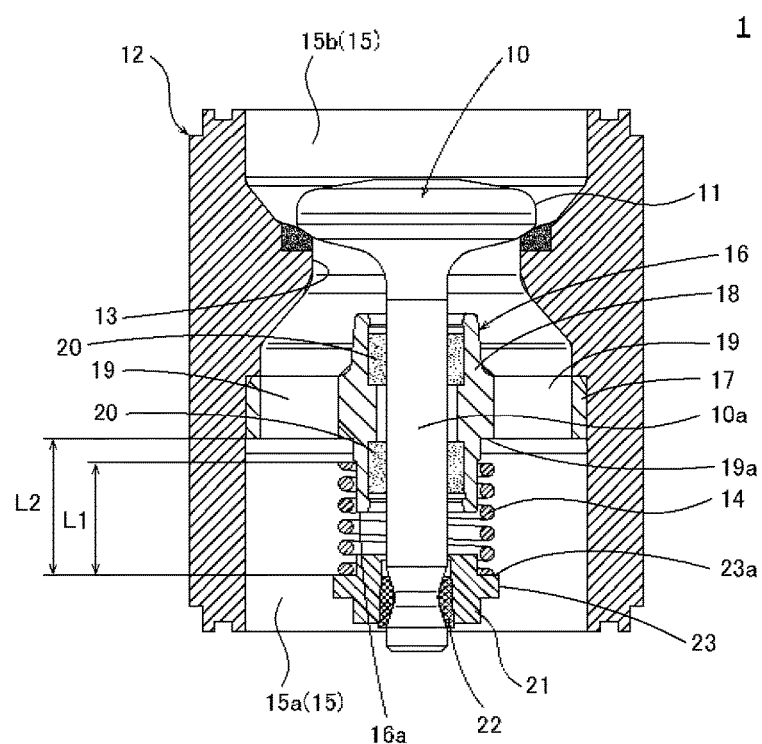
FIG. 3 is a sectional front view illustrating an example of a cone valve in a closed state, in which a valve body and a valve seat are being in contact with each other.
Figure 4:
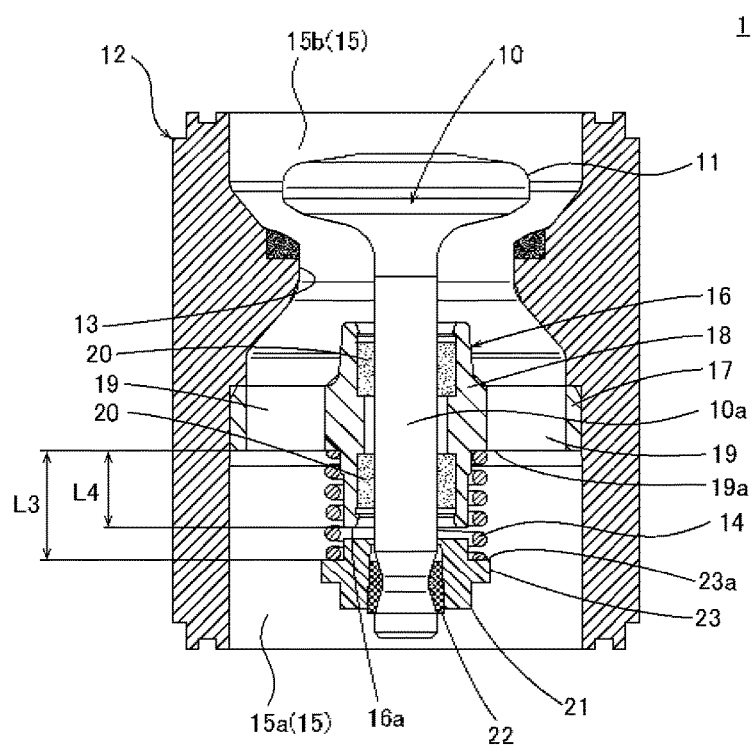
FIG. 4 is a sectional front view illustrating an example of a cone valve in an open state, in which a valve body and a valve seat are being separated.

Concretely, as illustrated in FIGS. 2, 3, and 4, the cone valve 1 at least comprises a valve part 10 with a valve body 11, a main body 12 with a valve seat 13, and a spring 14 incorporated to make the valve body 11 contact the valve seat 13.

As illustrated in FIG. 3, the valve part 10 comprises a cylindrical bar member 10a and the valve body 11 protruding radially outside of the bar member 10a from an end of the bar member 10a. This valve part 10 is accommodated in the main body 12 movably along axial direction of the main body 12, while arranging the valve body 11 at an end side of the main body 12 from the valve seat 13.

As illustrated in FIG. 3, the main body 12 is formed in tubular shape and comprises an insertion part 15 for inserting slurry into inside and for accommodating the valve part 10. Further, at halfway in the insertion part 15, the valve seat 13 protruding radially inside of the main body 12 and abutting the valve body 11 is formed.

Figure 5:
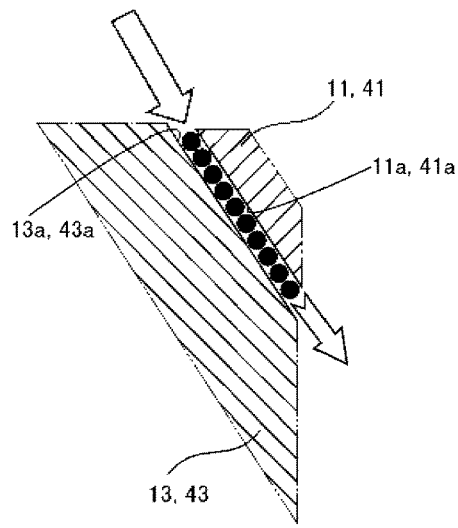
FIG. 5 is a schematic view illustrating flat contact surfaces of a cone valve relating to the present invention.

Also, as illustrated in FIG. 5, shapes of contact surfaces 11a, 13a of the valve body 11 of the valve part 10 and the valve seat 13 of the main body 12 are respectively formed linearly and flat in the sectional shape. Concretely, a contact surface 11a of the valve body 11 and a contact surface 13a of the valve seat 13 are flat inclined surfaces gradually expanding a diameter toward the end side from the other end side of the main body 12, and arranged in parallel to each other to make surface contact. Thus, the valve body 11 and the valve seat 13 are having large contact area, so slurry tend not to pass through even if the slurry is stuck in between the contact surfaces when the cone valve 1 is closed, therefore the local abrasion tend not to occur.

Figure 6:
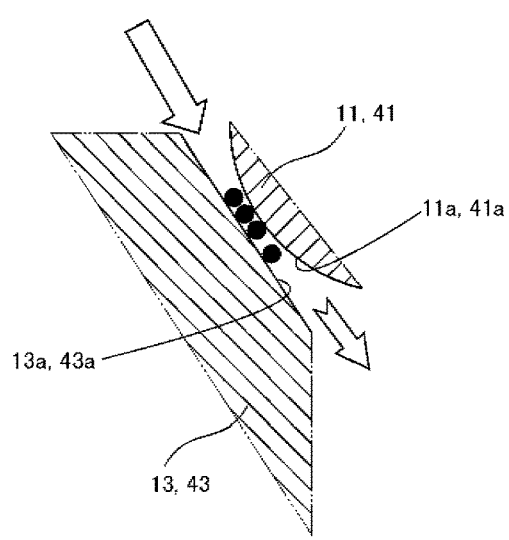
FIG. 6 is a schematic view illustrating a curved contact surface of a cone valve relating to the present invention.

In addition, as illustrated in FIG. 6, the shape of the contact surface 11a of the valve body 11 may be formed to be rounded and curved. Further, the shape of the contact surface 13a of the valve seat 13 may be formed to be rounded and curved. In other words, the shape of either one of the contact surface 11a of the valve body 11 and the contact surface 13a of the valve seat 13 may be formed to be rounded and curved, so that the valve body 11 and the valve seat 13 may be in point contact with each other (actually in circular contact). Further, the shapes of both of the contact surface 11a of the valve body 11 and the contact surface 13a of the valve seat 13 may be formed to be rounded and curved.

Also, as illustrated in FIG. 3, in the other end area 15a at the other end side of the main body 12, a sliding and supporting member 16 for slidably supporting the valve part 10 is mounted. This sliding and supporting member 16 comprises a fitting part 17 formed in annular shape and fitted to inner surface of the other end area 15a of the main body 12, a tubular sliding and supporting part 18 arranged in the fitting part 17 for slidably supporting the valve part 10 inserted inside the sliding and supporting part 18, and connections 19 plurally formed between the fitting part 17 and the sliding and supporting part 18 for connecting the fitting part 17 and the sliding and supporting part 18. In addition, the sliding and supporting part 18 may slidably support the valve part 10 via a sliding member 20 formed by a material excellent in sliding property and low friction property, or the sliding and supporting part 18 may slidably support the valve part 10 directly. Further, a spring 14 is arranged at an outer peripheral surface of the sliding and supporting part 18 at the other end side from the connections 19.

Also, as illustrated in FIG. 3, an abutting part 21 for abutting the spring 14 is mounted at the other end part of the valve part 10. This abutting part 21 is formed in tubular shape, and the other end part of the valve part 10 is inserted inside the abutting part 21, and the abutting part 21 is removably mounted to the other end part of the valve part 10 by a fixing member 22 such as a wedge member. Therefore, the abutting part 21 moves in the main body 12 along with the movement of the valve part 10 along the axial direction of the main body 12. Further, a flange part 23 protruding radially outside of the abutting part 21 is formed at the outer peripheral surface of the abutting part 21. Further, the abutting part 21 is arranged with the spring 14 at the outer peripheral surface of the abutting part 21 at the end side from the flange part 23. In addition, the abutting part 21 may be mounted by bonding, welding and else, without using the fixing member 22.

As illustrated in FIG. 4, the spring 14 is for example a coil spring, and arranged at outer peripheral surface of the sliding and supporting member 16 of the main body 12 and at outer peripheral surface of the abutting part 21 of the valve part 10, and an end part of the spring 14 is abutted to other end surface 19a of the connections 19 of the main body 12, and other end part of the spring 14 is abutted to an end surface 23a of the flange part 23 of the abutting part 21, and the valve part 10 is energized by the spring 14 toward the other end side of the main body 12 such that the valve body 11 arranged at the end side from the valve seat 13 will be abutted to the valve seat 13.

Also, as illustrated in FIG. 3, the entire length of the spring 14 is formed to be at least shorter than the stroke length of the valve body 11 (valve part 10).

Concretely, as illustrated in FIG. 3, the entire length (free height) L1 of the spring 14 is formed to be shorter than the stroke length L2, which is a length between the other end surface 19a of the connections 19 and the end surface 23a of the flange part 23 of the abutting part 21 in the closed state in which the valve body 11 and the valve seat 13 are being abutted to each other. As an example, the entire length (free height) L1 of the spring 14 is 155 mm and the stroke length L2 is 161 mm. Therefore, as illustrated in FIG. 4, when in the open state in which the spring 14 is bent in compression direction and the valve body 11 is separated from the valve seat 13, the spring 14 energizes the valve part 10 toward the other end side of the main body 12 until it will be free height and until the valve body 11 is in proximity to the valve seat 13. On the other hand, as illustrated in FIG. 3, when in the closed state in which the spring 14 becomes free height and the valve body 11 is in proximity to or abutting to the valve seat 13, the spring 14 does not energize the valve part 10 toward the other end side of the main body 12. In addition, the valve body 11 is then abutted to the valve seat 13 by the inertial force by the energization of the spring 14 and by the pressure difference between the end area 15b and the other end area 15a of the main body 12, in the state not energized by the spring 14.

Also, as illustrated in FIG. 4, the entire length (height at the time of allowed load) L3 of the spring 14 when it is bent in compression direction to the maximum is formed to be longer than the guide length L4 between the other end surface 19a of the connections 19 and other end surface 16a of the sliding and supporting member 16. Thereby, the spring 14 is protruding to the other end side more than the other end surface 16a of the sliding and supporting member 16, even if the spring 14 is bent in compression direction to what extent, so it prevents the fixation by hooking of the valve part 10 and the sliding and supporting member 16 and else, by preventing the sliding and supporting member 16 and the abutting part 21 of the valve part 10 from contacting each other.

The cone valve 1 having the above configuration flows the fluid from the other end area 15a at the other end side of the main body 12 toward the end area 15b at the end side of the main body 12, by separating the valve body 11 from the valve seat 13 by pushing up the valve body 11 to the end side of the main body 12 against the energizing force of the spring 14, when the fluid pressurized more than the prescribed value is fed from the other end side to the end side of the main body 12.

On the other hand, when the pressure at the end side of the main body 12 becomes or is higher than the pressure at the other end side of the main body 12, the cone valve 1 pushes down the valve body 11 to the other end side of the main body 12 with the help of the spring 14 to contact the valve body 11 to the valve seat 13, and shuts off the end area 15b at the end side of the main body 12 and the other end area 15a at the other end side of the main body 12 by putting a lid on the insertion part 15 by the valve body 11, and prevents the fluid from flowing backward from the end area 15b of the main body 12 to the other end area 15a of the main body 12.

Here, the inventors presumed as below about the cause of occurring malfunction of the cone valve, i.e. the factor causing communication between the upstream side and the downstream side of the cone valve. When the cone valve changes from the open state to the closed state, the highly abrasive particles inevitably contained in slurry will be interposed in a gap between the valve body and the valve seat, and the surface of either one of the valve body and the valve seat will be damaged. It depends on a size of a crack by the damage or a position of the crack, but the crack grows gradually by the repeated open and close of the cone valve (when stroke is 60%, approximately 1908 times/Hr), and at certain point, the crack becomes a flow channel allowing the slurry to flow backward, and through this crack, the communication between the upstream side and the downstream side of the cone valve begins. Then, the slurry always flows through the gap between the valve body and the valve seat and the abrasion progresses, and finally, large communicating part will be formed, so the feeding efficiency of the slurry decreases extremely, and it will be in the state that the part replacement is necessary.

Further, the inventors presumed that the degree of the first crack influences the term that the part replacement will be necessary, and found that strength of the spring is a cause of worsening the degree of crack. In other words, the strength of the spring is set at relatively strong level, in order to inhibit the backflow, and if the spring is too strong, when the cone valve becomes the closed state and interposes the highly abrasive particles simultaneously, the degree of the crack will be deeper and worse by the cause of this strength.

Therefore, the inventors have reached a conclusion that it is fine as long as the function of the spring in this cone valve is able to prevent fixation by hooking.

As mentioned above, even if the coarse particles are interposed when closing the cone valve 1, the cone valve 1 is capable of alleviating an impact thereof by configuring the entire length L1 of the spring 14 to be shorter than the stroke length L2 of the valve body 11 (valve part 10), and it is possible to alleviate the degree of crack by preventing the damage of the valve body 11 or the valve seat 13, which will be a trigger for uneven abrasion, so it is possible to maintain the lifespan two or three times longer than the conventional lifespan.

In addition, the stroke length means a length in the state that the spring 14 is incorporated in FIG. 3. Conventionally, when the spring 14 is incorporated to make the valve body 11 contact the valve seat 13, the spring 14 is fit between the stroke length (for example 161 mm) shorter than the natural length (for example 188 mm), and even in the state that the valve body 11 and the valve seat 13 are in contact with each other, a repulsive force of the spring 14 works and it is in the state that the valve body 11 is pushed onto the valve seat 13. Therefore, conventionally, the impact will be stronger as much as the repulsive force, when the coarse particles are interposed when closing the cone valve. In contrast, in the present invention, the natural length of the spring 14 is being shorter (for example 155 mm) than the stroke length. Therefore, it will be in the state that the repulsive force will not be worked, so it is possible to alleviate the impact as much as the repulsive force, even if the coarse particles are interposed when closing the cone valve.

Further, even if the coarse particles are interposed when closing the cone valve 1, the cone valve 1 is capable of dispersing the impact thereof by configuring shapes of contact surfaces 11a, 13a of the valve body 11 and the valve seat 13 to be flat, and it is possible to alleviate the degree of crack by preventing the damage of the valve body 11 or the valve seat 13, which will be a trigger for uneven abrasion, so it is possible to maintain the lifespan almost five times longer than the conventional lifespan.

Further, the cone valve 1 can be applied suitably if the slurry is slurry containing highly abrasive coarse particles (maximum particle size is 1 to 2 mm), and it can be applied particularly effectively, especially if the slurry is ore slurry obtained by treating nickel oxide ore.

EXAMPLES

Hereinafter, explaining about the examples applying the present invention, but the present invention should not be limited to the following examples.

The cone valve of the following example 1, example 2, and comparative example 1 were respectively installed in a feeding device as illustrated in FIG. 1, and operated to check the existence of malfunction.

Common conditions were as follows:
Slurry Solid content: Nickel oxide ore
  (Slurry with maximum particle size 1 to 2 mm)
Solid content concentration: 30 g/L
Feeding amount of slurry Approximately 240 m$^3$/Hr
  (at 60% stroke operation, operating two devices)
Stroke length of cone valve: 161 mm
Size of spring used for examples and comparative example.
  (Examples): Free length 155 mm
  (Comparative example): Free length 188 mm Example 1

In example 1, a cone valve as illustrated in FIG. 6, in which a shape of a contact surface of a valve body of a valve part contacting a valve seat of a main body was formed to be rounded and curved, was installed in the feeding device as illustrated in FIG. 1, and the slurry was fed. As a result, malfunction did not occur to the cone valve of the example 1 even after 645 hours of operation.

Example 2

In example 2, a cone valve as illustrated in FIG. 5 having a similar configuration as the example 1 except that shapes of contacting parts of a valve body of a valve part and a valve seat of a main body were respectively formed linearly and flat, was installed in the feeding device as illustrated in FIG. 1, and the slurry was fed. As a result, malfunction did not occur to the cone valve of the example 2 even after 968 hours of operation.

Comparative Example 1

In comparative example 1, a cone valve having a similar configuration as the example 1 except that a size of a spring was different, was installed in the feeding device as illustrated in FIG. 1, and the slurry was fed. As a result, malfunction occurred to the cone valve of the comparative example 1 in 200 hours, and part replacement was necessary.

As mentioned above, according to the example 1, it is possible to maintain the lifespan more than three times longer than the lifespan of the conventional cone valve (comparative example 1). Further, according to the example 2, it is possible to maintain the lifespan almost five times longer than the conventional cone valve (comparative example 1), so it can be understood that it is possible to use it for more than a month (approximately 720 hours).

<Explanation of Second Embodiment>

In the cone valve 1 of the first embodiment, the valve body 11 was arranged at the end side with respect to the valve seat 13, and the spring 14 was arranged at the other end side, and the valve body 11 and the spring 14 were arranged in different direction with respect to the valve seat 13, but in a cone valve 31 of second embodiment, a valve body 41 and a spring 44 are arranged in same direction with respect to a valve seat 43.

Figure 7:
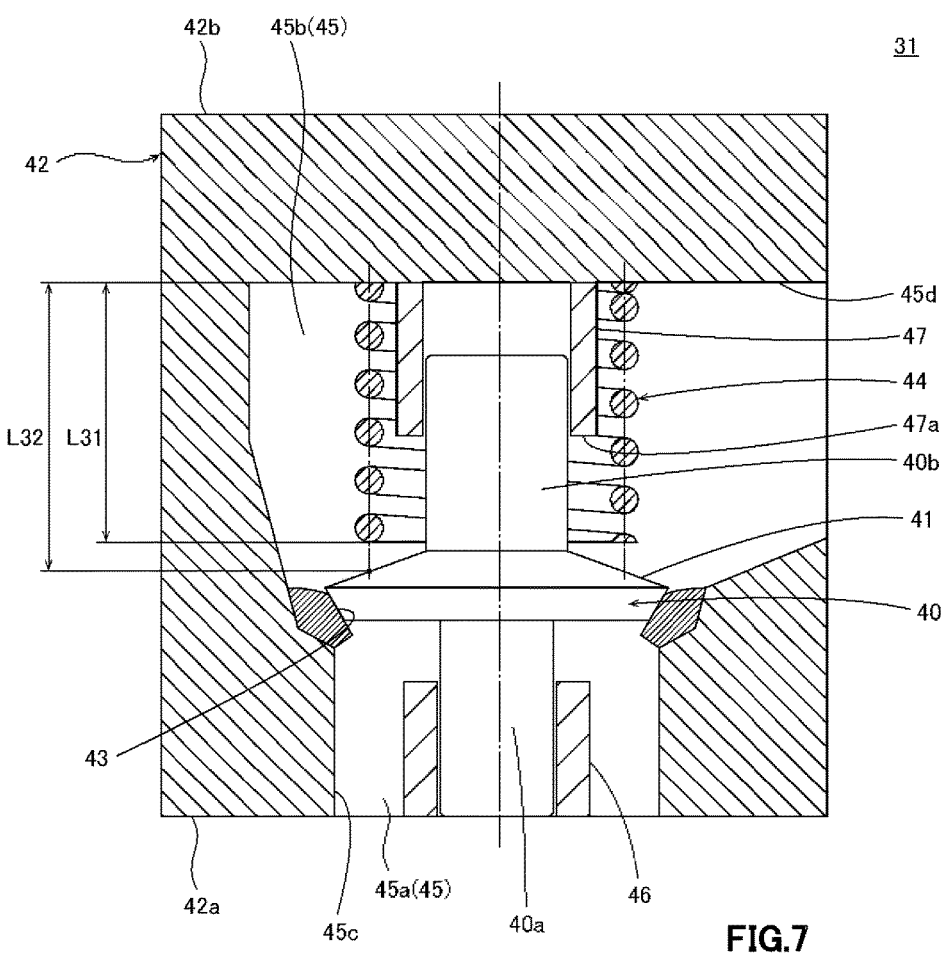
FIG. 7 is a sectional front view illustrating other example of a cone valve in a closed state, in which a valve body and a valve seat are being in contact with each other.
Figures 8, 9:
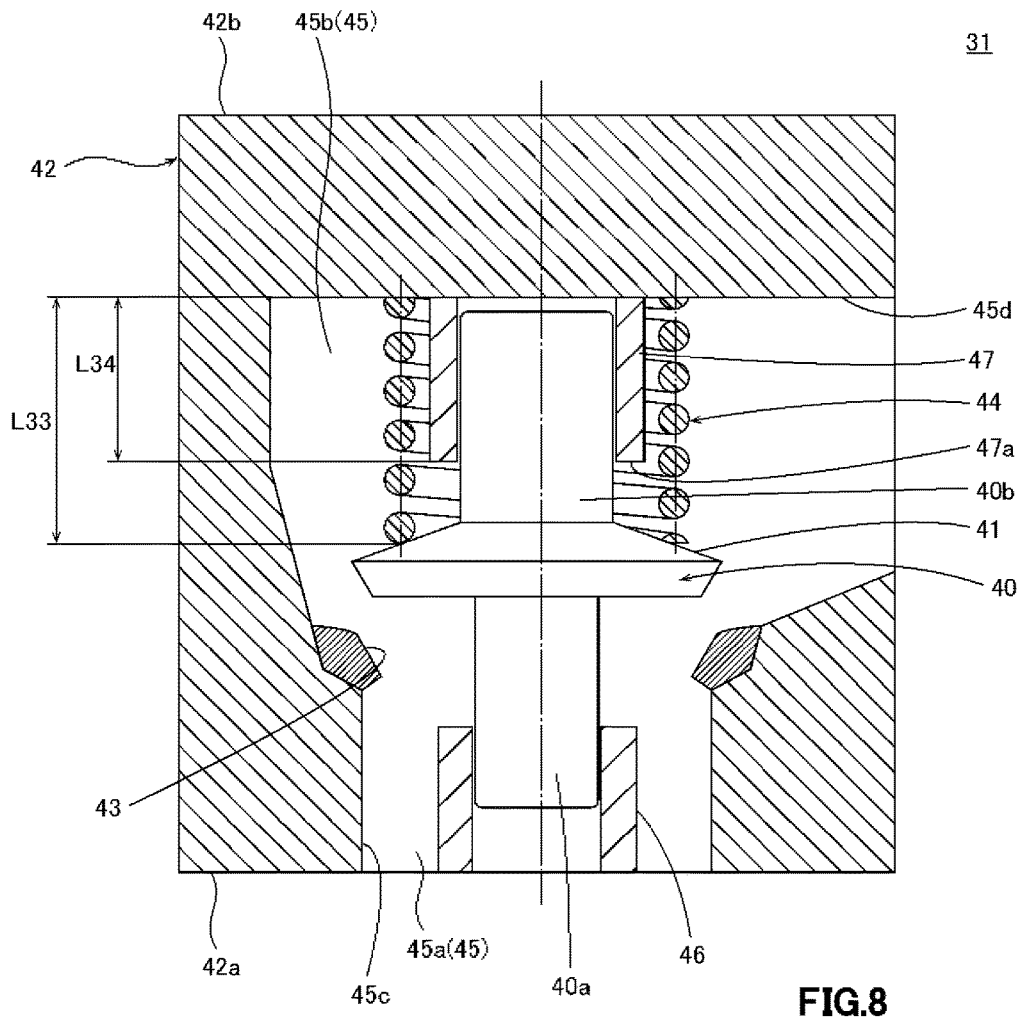
FIG. 8 is a sectional front view illustrating other example of a cone valve in an open state, in which a valve body and a valve seat are being separated.
FIG. 9 is a table exemplifying characteristics of ore slurry.

Concretely, as illustrated in FIGS. 7 and 8, a cone valve 31 at least comprises a valve part 40 having a valve body 41, a main body 42 having a valve seat 43, and a spring 44 incorporated to make the valve body 41 contact the valve seat 43.

As illustrated in FIG. 7, the valve part 40 comprises cylindrical first and second bar members 40a, 40b, and the valve body 41 arranged between the first and second bar members 40a, 40b, and protruding radially outside of the first and second bar members 40a, 40b. This valve part 40 is accommodated in the main body 42 movably along the axial direction of the main body 42, while the first bar member 40a is slidably accommodated in a first guide part 46 of the main body 42, and while the second bar member 40b is slidably accommodated in a second guide part 47 of the main body 42, and also, while the valve body 41 is arranged at the end side of the main body 42 from the valve seat 43.

As illustrated in FIG. 7, the main body 42 is formed in tubular shape and comprising an insertion part 45 through which slurry is inserted to inside and in which the valve part 40 is accommodated. For example, this insertion part 45 is formed in approximately L shape, so that a bottom surface opening 45c formed at a bottom surface 42a of the main body 42 and a side surface opening 45d formed at a side surface of the main body 42 are being communicated with each other. Further, in the midway at the bottom surface 42a side in the insertion part 45, the valve seat 43 protruding radially inside of the main body 42 and abutting the valve body 41, is formed.

Also, the shapes of the contact surfaces 41a, 43a of the valve body 41 of the valve part 40 and the valve seat 43 of the main body 42 are respectively formed linearly and flat in the sectional shape, as illustrated in FIG. 5, as well as the cone valve 1 of the embodiment 1. Concretely, the contact surface 41a of the valve body 41 and the contact surface 43a of the valve seat 43 are flat inclined surfaces gradually expanding a diameter from the other end side to the end side of the main body 42, and arranged in parallel to make surface contact with each other. Thus, the valve body 41 and the valve seat 43 are having large contact area, so slurry tend not to pass through even if the slurry is stuck in between the contact surfaces when closing the cone valve 31, therefore local abrasion tend not to occur.

In addition, the shape of the contact surface 41a of the valve body 41 may be formed to be rounded and curved as illustrated in FIG. 6, as well as the cone valve 1 of the first embodiment. Further, the shape of the contact surface 43a of the valve seat 43 may be formed to be rounded and curved. In other words, the shape of either one of the contact surface 41a of the valve body 41 and the contact surface 43a of the valve seat 43 may be formed to be rounded and curved, so that the valve body 41 and the valve seat 43 may be in point contact with each other (actually in circular contact). Further, the shapes of both of the contact surface 41a of the valve body 41 and the contact surface 43a of the valve seat 43 may be formed to be rounded and curved.

Also, as illustrated in FIG. 7, a tubular first guide part 46 slidably supporting the valve part 40 is formed at the bottom surface 42a side of the main body 42. This first guide part 46 is arranged in the other end area 45a of the other end side of the main body 42 via a connection (not illustrated) and else, and also, arranged coaxially with a central axis of the bottom surface opening 45c of the main body 42, and slidably supporting the valve part 40 by inserting the first bar member 40a inside thereof.

Also, as illustrated in FIG. 7, a tubular second guide part 47 slidably supporting the valve part 40 is formed at inner wall surface of a top surface 42b of the main body 42. This second guide part 47 is arranged in the end area 45b of the end side of the main body 42, and also, arranged coaxially with the first guide part 46, and slidably supporting the valve part 40 by inserting the second bar member 40b inside thereof. Further, the spring 44 is arranged at outer peripheral surface of the second guide part 47.

As illustrated in FIG. 8, the spring 44 is, for example a coil spring, arranged at the outer peripheral surface of the second guide part 47 of the main body 42, and an end part of the spring 44 is abutting the inner wall surface of the top surface 42b of the main body 42, and other end part of the spring 44 is abutting the valve body 41 of the valve part 40, and the valve part 40 is energized by the spring 44 toward the other end side of the main body 42 such that the valve body 41 arranged at the end side from the valve seat 43 will be abutted to the valve seat 43.

Also, as illustrated in FIG. 7, the entire length of the spring 44 is formed to be at least shorter than the stroke length of the valve body 41 (valve part 40).

Concretely, as illustrated in FIG. 7, the entire length (free height) L31 of the spring 44 is formed to be shorter than the stroke length L32, which is a length between the inner wall surface of the top surface 42b of the main body 42 and the valve body 41 of the valve part 40 in the closed state, in which the valve body 41 and the valve seat 43 are being abutted. As an example, the entire length (free height) L31 of the spring 44 is 155 mm, and the stroke length L32 is 161 mm. Therefore, as illustrated in FIG. 8, when in the open state in which the spring 44 is bent in compression direction and the valve body 41 is separated from the valve seat 43, the spring 44 energizes the valve part 40 toward the other end side of the main body 42 until it will be free height and until the valve body 41 is in proximity to the valve seat 43. On the other hand, as illustrated in FIG. 7, when in the closed state in which the spring 44 becomes free height and the valve body 41 is close to or abutting to the valve seat 43, the spring 44 does not energize the valve part 40 toward the other end side of the main body 42. In addition, the valve body 41 is then abutted to the valve seat 43 by the inertial force by the energization of the spring 44 and by the pressure difference between the end area 45b and the other end area 45a of the main body 42, in the state not energized by the spring 44.

Also, as illustrated in FIG. 8, the entire length (height at the time of allowed load) L33 of the spring 44 when it is bent in compression direction to the maximum is formed to be longer than the length L34 between the inner wall surface of the top surface 42b of the main body 42 and other end surface 47a of the second guide part 47. Thereby, the spring 44 is protruding to the other end side more than the other end surface 47a of the second guide part 47, even if the spring 44 is bent in compression direction to what extent, so it prevents the fixation by hooking of the valve body 41 and the second guide part 47, by preventing the valve body 41 and the second guide part 47 from contacting each other.

As well as the cone valve 1 of the first embodiment, the cone valve 31 having the above configuration flows the fluid from the other end area 45a at the other end side of the main body 42 toward the end area 45b at the end side of the main body 42, by separating the valve body 41 from the valve seat 43 by pushing up the valve body 41 to the end side of the main body 42 against the energizing force of the spring 44, when the fluid pressurized more than the prescribed value is fed from the other end side to the end side of the main body 42.

On the other hand, as well as the cone valve 1 of the first embodiment, the cone valve 31 prevents the fluid from flowing backward from the end area 45b of the main body 42 to the other end area 45a of the main body 42, by shutting off the end area 45b at the end side of the main body 42 and the other end area 45a at the other end side of the main body 42 by putting a lid on the insertion part 45 by the valve body 41, by pushing down the valve body 41 to the other end side of the main body 42 with the help of the spring 44 to contact the valve body 41 to the valve seat 43, when the pressure at the end side of the main body 42 becomes or is higher than the pressure at the other end side of the main body 42.

As mentioned above, as well as the cone valve 1 of the first embodiment, even if the coarse particles are interposed when closing the cone valve 31, the cone valve 31 is capable of alleviating an impact thereof by configuring the entire length L31 of the spring 44 to be shorter than the stroke length L32 of the valve body 41, and it is possible to alleviate the degree of crack by preventing the damage of the valve body 41 or the valve seat 43, which will be a trigger for uneven abrasion, so it is possible to maintain the lifespan two or three times longer than the conventional lifespan.

Further, as well as the cone valve 1 of the first embodiment, even if the coarse particles are interposed when closing the cone valve 31, the cone valve 31 is capable of dispersing the impact thereof, by configuring the shapes of the contact surfaces 41a, 43a of the valve body 41 and the valve seat 43 to be flat, and it is possible to alleviate the degree of crack by preventing the damage of the valve body 41 or the valve seat 43, which will be a trigger for uneven abrasion, so it is possible to maintain the lifespan almost five times longer than the conventional lifespan.

Further, as well as the cone valve 1 of the first embodiment, the cone valve 31 can be applied suitably if the slurry is slurry containing highly abrasive coarse particles (maximum particle size is 1 to 2 mm), and it can be applied particularly effectively, especially if the slurry is ore slurry obtained by treating nickel oxide ore.

Glossary of Drawing References

1 Cone valve
1a Upstream side cone valve
1b Downstream side cone valve
10 Valve part
10a Bar member
11 Valve body
11a Contact surface
12 Main body
13 Valve seat
13a Contact surface
14 Spring
15 Insertion part
15a Other end area
15b End area
16 Sliding and supporting member
16a Other end surface
17 Fitting part
18 Sliding and supporting part
19 Connections
19a Other end surface
20 Sliding member
21 Abutting part
22 Wedge member
23 Flange part
23a End surface
31 Cone valve
40 Valve part
40a First bar member
40b Second bar member
41 Valve body
41a Contact surface
42 Main body
42a Bottom surface
42b Top surface
43 Valve seat
43a Contact surface
44 Spring
45 Insertion part
45a Other end area
45b End area
45c Bottom surface opening
45d Side surface opening
46 First guide part
47 Second guide part
47a Other end surface
100 Feeding device
101 Upstream side slurry tank
102 Downstream side slurry tank
103 Diaphragm type pump
104 First pipe
105 Second pipe
106 Connection

The invention claimed is:

1. A cone valve used as a check valve when feeding slurry of nickel oxide ore, the cone valve comprising:
a valve part having a valve body;
a valve seat; and
a single spring having a configuration whereby the valve body and the valve seat do not contact each other when the spring has a free height,
wherein the spring does not energize the valve body toward an end side of a main body of the cone valve when in a closed state in which the valve body and the valve seat are being abutted,
wherein a contact surface of the valve body and a contact surface of the valve seat are flat inclined surfaces gradually expanding in diameter toward an other end side of the main body from the end side of the main body, the contact surface of the valve body and the contact surface of the valve seat being arranged in parallel with each other and making surface contact with each other, so as to limit the slurry from passing through even if the slurry is stuck in between the contact surface of the valve body and the contact surface of the valve seat when the cone valve is closed, and wherein the spring is arranged at an outer peripheral surface of a sliding and supporting member of the main body and at an outer peripheral surface of an abutting part of the valve part, whereby an end part of the spring is abutted to an end surface of a flange part of the abutting part of the valve part.

* * * * *